March 27, 1962 D. I. WEINBERG 3,026,868
RESPIRATION MEASURING APPARATUS AND METHOD
Filed Aug. 5, 1960 2 Sheets-Sheet 1

INVENTOR.
Daniel I. Weinberg
BY
B. B. Olive
ATTORNEY

March 27, 1962  D. I. WEINBERG  3,026,868
RESPIRATION MEASURING APPARATUS AND METHOD
Filed Aug. 5, 1960  2 Sheets-Sheet 2
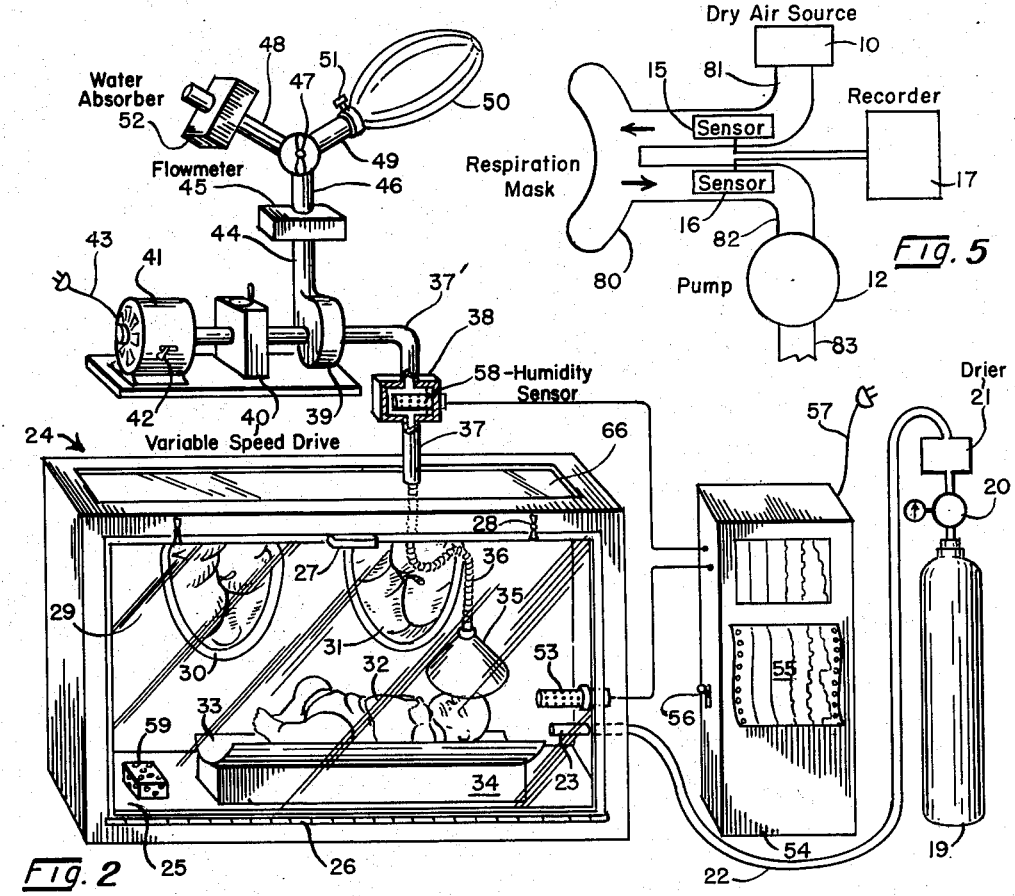

United States Patent Office 3,026,868
Patented Mar. 27, 1962

3,026,868
RESPIRATION MEASURING APPARATUS
AND METHOD
Daniel L. Weinberg, Durham, N.C., assignor to Astra,
Inc., Raleigh, N.C., a corporation of North Carolina
Filed Aug. 5, 1960, Ser. No. 47,814
14 Claims. (Cl. 128—2.08)

This invention relates to an apparatus and method for measuring the amount of air breathed per breath and over a period of time and is particularly adaptable to infant persons and small animals.

In general medical practice, in medical research and more recently in space research, it is desirable to measure in both humans and research animals what are referred to as tidal volume and minute volume, the former referring to air volume per breath and the latter to air volume breathed per minute. Conventional respiration volume measuring apparatus known as spirometers, require the subject to breathe into some form of mask that is held or pressed against the face during the test and the breathed air operates a mechanical or electrical measuring device. Infants, research animals and certain adults with mental and physical disorders resist the use of such masks which makes the taking of respiration volume measurements difficult and the results of questionable validity. While the use of masks has been eliminated in many related areas affecting patient respiration such as in oxygen tents, incubators and basal metabolism test apparatus incorporating respiration hoods, masks continue to be employed for respiration volume measurements on all types of subjects even though their several disadvantages have been recognized.

Of further interest to an understanding of the invention is the fact that a human as well as an animal breathing body tends to saturate with moisture such air as is breathed into and out of the body. The invention employs this saturating characteristic for purposes of respiration volume measuring by arranging for the body to breathe exclusively from and into a suitable stream of substantially dry gas, such as air or oxygen, of known humidity and rate of flow. By measuring the change in humidity brought about by the saturating characteristic of the breathing organs of the body, the volume of gas breathed per breath or over a period of time can be determined.

With the foregoing in mind, the invention recognizes the disadvantages of the mask system particularly for infants and animals and has as an object the provision of a respiration volume measuring apparatus and method which is adaptable to masks but which is especially adaptable to being incorporated as a part of respiration hoods, oxygen tents, incubators and the like.

An object is also that of providing a respiration measuring method and apparatus which uses the saturating characteristic of the subject's breathing organs as an index to the subject's tidal and minute volume as well as respiration rate and which dose not entail use of the subject's energy.

Another object is to provide a respiration volume measuring method and apparatus wherein the subject is allowed to breathe, unhampered by masks and the like, exclusively from and into a continuous stream of substantially dry gas, such as air or oxygen, flowing at a given rate past the subject's face and the gas stream is analyzed for moisture content contributed by the subject by reason of the breathing action as an index of the subject's tidal and minute volumes.

Another object is the provision of a novel respiration measuring apparatus and method whereby a subject's tidal and minute volumes as well as his respiration rate may be continuously monitored while the subject is under examination.

These and other objects will appear as the description proceeds and in the drawings, in which:

FIGURE 2 is a perspective view of an incubator apparatus embodying the invention.

FIGURE 3 is a schematic view of an alternative method of introducing the gas to the subject.

FIGURE 5 is a block diagram representing application of the invention to a mask.

FIGURE 6 is a somewhat schematic diagram representing use of ambient air as a dry air source.

While generally applicable to masks and especially to respiration hoods, oxygen tents, space chambers and the like, the embodiment chosen to illustrate the invention is concerned with the measuring of respiration volume in an infant confined in an incubator like enclosure. Respiration rate is also obtained during the measuring of respiration volume. The embodiment described comprises, in general, the provision of a hood preferably over at least the head of the breathing infant and the introduction into the hood, at a constant rate of flow, of a continuous stream of substantially dry, breathable gas, such as air or oxygen, past the head of the infant such that the infant will breathe exclusively from the stream of dry gas and will introduce a portion of the same gas, modified by respiration and in saturated condition, back into the stream. The humidity content of the gas stream is monitored prior to and after passing the infant's head and the amount of moisture introduced into the stream by the infant is taken as an indication of the volume rate at which the infant's breathing organs are acting at the time of measurement.

Figure 1:
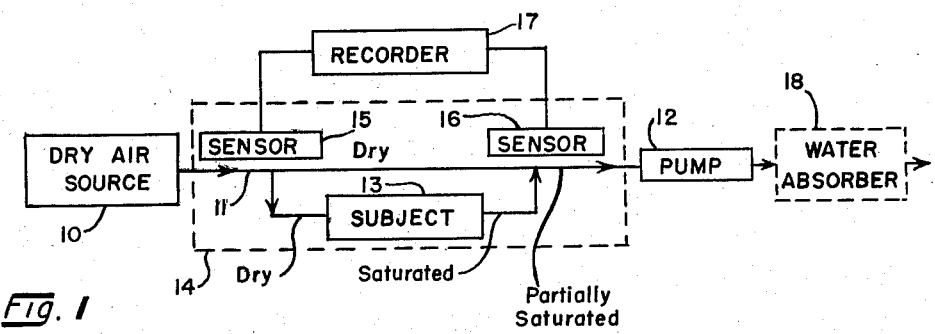
FIGURE 1 is a block diagram illustrating the invention.

To obtain a general understanding, reference is first made to the block diagram in FIGURE 1 in which the invention is shown in schematic and general form. A dry gas source 10 furnishes the dry gas, such as dry air, in a continuous stream 11 of constant volume flow as controlled by a constant volume air pump 12. The subject 13 is confined within a hood or enclosure indicated by dotted line 14 which also contains a sensor 15 that monitors the temperature and humidity of the stream just prior to the subject's breathing from the stream and a sensor 16 which monitors the temperature and humidity of the stream just after the subject has breathed into the stream. The hood is preferably air tight or under slight positive pressure so that the subject will breathe the dry air exclusively. As indicated in FIGURE 1, some of the dry air will bypass the subject's head and some will be breathed. The breathed air will become saturated and when recombined with the dry air will make the dry air partially saturated. By recording on a recorder 17 the measurements taken by sensors 15 and 16, such measurements may be converted, as later described, to a measurement which indicates the volume of air breathed by the subject from the stream in the given period of time. It will be recognized that by passing a given volume of dry gas past the subject and measuring the amount of moisture contributed by the subject to this given volume, the volume of air required to be breathed and saturated in order to produce such amount of moisture can be determined. Where a long term contribution of moisture by the subject is to be measured, the amount of moisture can be determined by inserting a suitable water absorber as indicated in dotted lines at 18 and measuring the weight of this absorber in first the dry and later, the wet state. The gain in weight which is equal to the amount of water absorbed, can be converted to an indication of the volume of air breathed during the period of time involved which in turn can be converted to average tidal and minute volume measurements.

In FIGURE 2, the dry air source 10 of FIGURE 1 is shown in the form of a bottle of compressed dry air 19 which is connected through a pressure regulating valve 20 to a supplementary drier 21, the purpose being to obtain air of maximum dryness. A flexible conduit 22 carries the air to an outlet pipe 23 located in a sidewall of an incubator like enclosure 24. Enclosure 24 is preferably of an air tight nature but may have an open bottom so that it may be placed on mattresses holding sleeping infants and the like. Where an open bottom enclosure is employed, the air tight effect may be achieved by maintaining a slight positive pressure within the enclosure. Enclosure 24 includes a transparent door 25 hinged at 26 and provided with a handle knob 27 and latches 28 whereby the door may be latched in a closed vertical position or unlatched to move in a downwardly and outwardly direction so as to facilitate placing of infant subjects in the enclosure. On the rear wall 29, preferably also of transparent material, are located a pair of conventional armholes 30, 31 of the elastic band type which automatically close and become gasproof when the doctor's arms are removed and which fit tightly around the arms when being used. The infant 32 is placed in a pan 33 located on a pedestal 34. Immediately above the infant's head there is located a conical inverted funnel shaped open receiver 35 formed of transparent material and connected to a flexible conduit 36 enabling the receiver to be moved in position in respect to the infant's head.

In association with conduit 36 is a further conduit 37 which passes through a chamber 38, whose purpose is later explained, to a constant volume air pump 39 driven through a variable speed drive 40 by an electric motor 41 having a switch 42 and a power supply cord 43. Pump 39 draws air through receiver 35 at a predetermined rate of flow as regulated by the setting of variable speed drive 40, through conduits 36 and 37 and then forces the air out through conduit 44. Conduit 44 is connected to a conventional flowmeter somewhat schematically represented at 45 from which the air passes through a conduit 46 to a conventional three way valve 47 which can be adjusted to close conduit 46 or connect conduit 46 with conduit 48 or connect conduit 46 with conduit 49. For certain types of patient and tests, it is desirable to collect all of the air breathed by the patient and for this purpose a gas collecting bag 50 is connected to conduit 49 by means of hand clamp 51. For other tests, the air may be exhausted to the atmosphere through either conduit 48 or conduit 49 or, for extended tests, it may be passed through a water absorber as at 52 and the difference in weight between the dry and wet state of the absorber, as measured at the beginning and end of the test, may be used as a measure of the long term contribution of moisture by the infant to the air stream and this measure may, in turn, be converted to average tidal and minute volume indications.

In order to record the entrance temperature and humidity conditions, a sensor 53 is located in the air stream near the receiver 35 but away from the infant's head and the partially saturated portion of the stream. That is, the purpose of sensor 53 is to measure the temperature and humidity of the dry air stream immediately prior to its being affected by the infant's breathing. It is preferable that this sensor, nevertheless, be located as close to the infant's head as possible in order to detect immediately any air conditions that might affect the safety or life of the infant. The output of sensor 53 is fed to a suitable recorder such as linear and integrating recorder 54 having a strip chart record 55, an on-off switch 56 and a power supply cord 57. Once the stream has been partially saturated by reason of the infant's breathing, the humidity of the stream is changed and this change is detected by sensor 58 located in chamber 38 previously referred to. Sensor 58 is similar to sensor 53 and is of the fast response, high sensitivity type giving an indication of both temperature and relative humidity which is fed to recorder 54 along with similar information fed from sensor 53.

In operation, flow of dry air through the apparatus is established prior to placing the infant in position in order to flush out extraneous moisture. This procedure is started by placing door 25 in closed position by means of latches 28 which makes enclosure 24 a substantially air-tight chamber. Valve 47 is adjusted to direct exhaust air into either conduit 48 or 49 and the conduit chosen is preferably deprived of its water absorber or gas collection bag, as the case may be, in order that the air may exhaust directly into the atmosphere. With door 25 closed and the conduits so arranged, valve 20 is opened sufficiently to establish a slight positive pressure in the enclosure. Power supply cord 43 is connected and switch 42 cut on to start motor 41, variable speed drive 40 and the fan (not shown) of air pump 39. A flow indication can now be read on flowmeter 45 and the speed of drive 40 on the output side is regulated until the desired volume is established which should be in the order of twice the anticipated peak expiration rate of the infant. With these conditions established, the infant 32 is placed in position and the receiver 35 regulated until it resides just above the infant's face. Door 25 is closed and latched. Power cord 57 is connected and switch 56 is turned on to start the recorder 54. Depending on the nature of the test, gas collection bag 50 may be installed at this point or water absorber 52 may be located on conduit 48 and the exhaust air handled accordingly.

As the dry air stream flows continuously past the infant's head, a portion of the dry air in the stream is periodically withdrawn into the infant's lungs during breathing where the air becomes saturated and upon reentering the stream causes the humidity of the stream to rise which is immediately sensed by sensor 58. The temperature on the other hand remains substantially constant though a very slight change in temperature of the stream is effected in each breath. To insure that a minimum amount of moisture remains in the enclosure itself during the running of the tests, an appropriate number of desiccants 59 are located to absorb any extraneous moisture as might develop from the infant's perspiration, urination or the like.

Where the extraneous moisture is in unusual quantities as with excessively perspiring patients, an alternative form of air inlet and outlet and sensor location may be resorted to as schematically represented in cross section in FIGURE 3. In the structure of FIGURE 3, 60 represents a conical funnel shaped receiver in which there is a thin wall conical funnel shaped inner receiver 61 and a thin wall outer conical funnel shaped receiver 62 in coaxial radially spaced arrangement, one receiver residing within the other. Outer receiver 62 is connected to a conduit 63 which in turn is connected to a chamber 64 holding sensor 53 and which is similar in purpose to the chamber 38 of FIGURE 1. Chamber 64 is further connected to the conduit 22 of FIGURE 1 and thence to the dry gas source 19, not shown in this figure. Inner receiver 61, on the other hand is connected through a conduit 65 which passes through the side of conduit 63 to a chamber 64' holding sensor 58 and which is further connected to conduit 37' a portion of conduit 37 shown in FIGURE 1 from which it leads to air pump 39 of FIGURE 1, not shown in this figure. As represented in FIGURE 3, conduits 63 and 65 are in coaxial relationship below top wall 66 of enclosure 24 through which they pass and this coaxial portion is preferably formed of flexible conduit material to facilitate positioning of receiver 60 over the infant's face. As illustrated by the arrows in FIGURE 3, the air flow in the receiver 60 is such that the air flows only over the infant's face before being passed to sensor 58. Thus, the effect of any extraneous moisture in the enclosure 24 as might be brought about by perspiration or urination by the infant is minimized. This coaxial arrangement also eliminates the need for an air tight enclosure as the ambient air has very little effect on the results.

Figure 4:
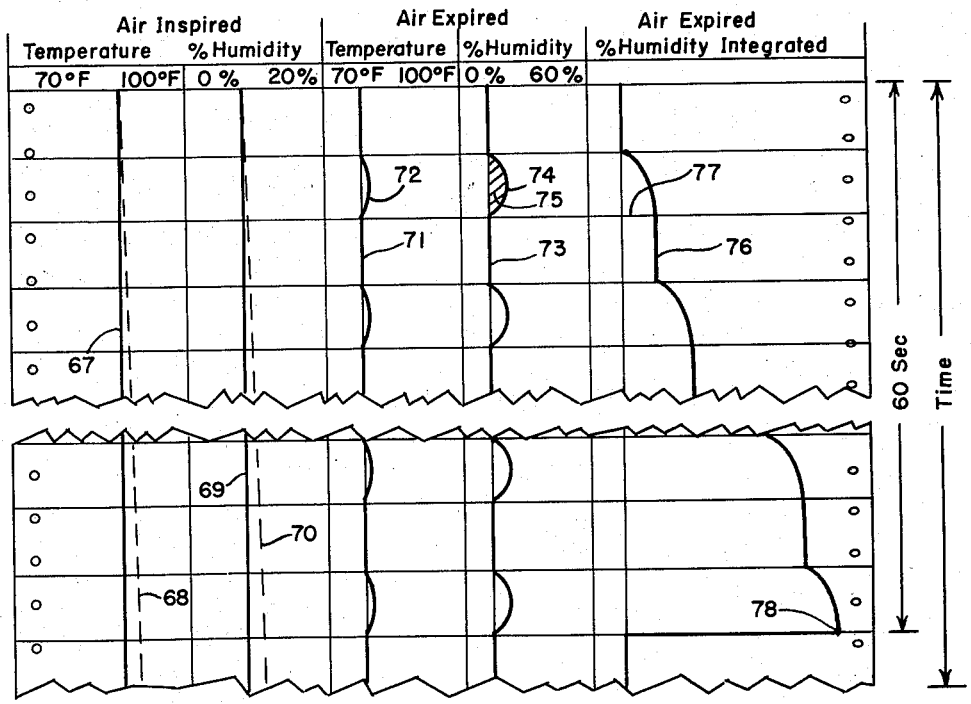
FIGURE 4 is an enlargement of a representative section of strip chart record of the conditions measured.

Recorder 54 is of the type which includes inked trace lines or curves representing the initial temperature and relative humidity prior to the air reaching the infant, the final temperature and relative humidity of the air after it has been breathed into by the infant and, in addition, there is made a record of the integral of the final relative humidity. A somewhat schematic representation of strip chart 55 showing the general shape of these various recordings is shown in FIGURE 4. It should be understood that for practical reasons the actual chart partakes of a substantially different form from that shown in FIGURE 4 which is designed only to show the general relation of the recorded data. The initial temperature as detected by sensor 53 and as indicated at 67 will generally assume a straight line though with some infants, the infant's temperature may tend to rise in which case the initial temperature may assume the generally increasing characteristic indicated at 68 and corrections, if necessary, should be made accordingly. The initial relative humidity indicated at 69 will likewise assume a generally straight line curve though because of additional humidity contributed by the infant's perspiring in the enclosure, the curve is apt to assume a gradually rising shape as indicated at 70 which may require a correcting procedure.

The temperature of the air stream after it passes the face will generally rise but slightly during expiration. Curve 71 represents the temperature of the stream as affected by the expired air and it will be noticed that a series of slight humps 72 occur in the curve on the occasion of each breath. Curve 73 is a trace representing the relative humidity in percent and from this trace a series of very prominent humps 74 will be seen in periodic sequence which are caused by the addition of moisture to the stream on each breath. That is, each hump 74 corresponds to the moisture rise contributed by a single expiration and the integral 75, represented in cross-hatch, of the area under each hump with respect to time is representative of the total amount of moisture contributed per breath, and this moisture per breath is representative of the amount of air breathed per breath.

To facilitate making the calculations, an additional trace represented by curve 76 is included in the recorder. Curve 76 represents the integral of curve 73 so that the integral of curve 73 for one breath cycle as at 77 or for the number of breath cycles occurring in, for example, one minute can be easily determined. Curve 76 and its related recording mechanism are chosen so that it resets on one minute intervals as at 78. By using the point of resetting as a zero reference, the minute integral for minute volume calculations is more easily determined. As will be apparent to those familiar with psychometric methods, the apparatus and method will exhibit their greatest sensitivity with air of maximum dryness. Appropriate correction should be made for any humidity present in the dry gas prior to its passing the subject.

The measured relative humidity integral, as corrected, may be converted by any of several known mathematical and psychometric methods to an absolute humidity integral reading such as in units of grams of water per liter of dry air times seconds. The number of grams of water per liter of saturated air exhaled at body temperature is a known quantity and from this an equation of the following description can be set up:

$$\left(\frac{\text{Absolute Humidity Integral}}{\text{Grams}} \times \text{Seconds}\right) \times \left(\frac{\text{Flow Rate}}{\text{Liters}}\right) \div \left(\frac{\text{Absolute Humidity of Saturated Exhaled Air}}{\text{Grams}}\right) = \text{Air Volume Breathed Liters}$$

From the above equation, the grams of moisture contributed by breathing can be seen to be the product of the absolute humidity integral and the flow rate. An alternative means of obtaining the subject number of grams of moisture and which follows the approach of other chemical studies is achieved by directing all of the exhaled air through water absorber 52 and measuring the difference in weight between the dry and wet state of the absorber. This difference as adjusted by any relevant correction factor such as absorber efficiency, directly represents the subject amount of moisture contributed and when divided by the grams of water per liter of saturated exhaled air gives the volume breathed for the period of time in question.

Among the several advantages of recording and interpreting the data as described rather than using a water absorber is the fact that the respiration rate, breaths per minute, can be determined and followed simply by counting the number of moisture humps 74 over minute intervals. That is, the invention not only provides a respiration volume apparatus and method but also a respiration rate, breaths per minute, apparatus and method. In such application, the only sensor required is the one which detects the partially saturated air leaving the body, such as sensor 16 in FIGURE 6.

Where the described sensors are used for measuring the moisture contributed by the body, it is highly desirable that the flow of dry gas be at a constant rate. However, it should be recognized that special conditions may require the gas to flow at a variable rate in which event the subject moisture content may be measured by determining the total volume of gas passed during the period of measuring and using a moisture absorber as the measure of moisture contributed. The sensor system may also be used with a variable rate of partially saturated air flow provided the instantaneous flow rate and humidity are correlated. That is, if the instantaneous flow rate and the corresponding instantaneous humidity are known for the whole period of measuring, the total moisture contributed by the body can then be calculated.

From the viewpoint of method it can be seen that for measuring respiration volume rate, the invention generally follows these steps:

(1) Establish a predetermined flow of substantially dry breathable gas, of known conditions, by the subject's face.

(2) Arrange for the subject to breathe exclusively from and into the stream for a predetermined time.

(3) Continuously measure the amount of moisture contributed by the subject to the stream during the stated time, and (4) Convert the total measured amount of moisture to volume of air breathed during this same time.

When applied to measuring respiration rate only, as distinct from respiration volume rate, the saturating characteristic of the body is still employed but in fewer steps; namely:

(1) Locating a moisture sensitive sensor in the path of expired air.

(2) Allowing the sensor to respond with each successive breath, and (3) Counting the number of responses per unit of time as a measure of the respiration rate.

While particularly suited to respiration hoods, oxygen tents, incubators and the like the invention is adaptable to respiration masks as illustrated in block diagram in FIGURE 5. In this figure, 80 represents a respiration mask in communication on its inlet side through a conduit 81 with the dry air source 10. On its outlet side the mask communicates through a conduit 82 to the constant volume pump 12 which exhausts to the atmosphere at 83. Within conduit 81, is the temperature-humidity sensor 15 and within conduit 82 there is located the sensor 16, both of which feed to the recorder 17. In operation, the subject breathes from and into the stream of dry gas which passes continuously through the mask at a known constant rate, the conditions of which, both before and after entering the mask, are simultaneously recorded on recorder 17. The recorded data is then translated into a respiration volume measurement as previously explained.

In the normal respiration test situation, it will be necessary to have available a suitable source of dry air. However, where the environmental air itself is sufficiently dry and calm as in a desert area or in a very cold dry area, such as might be found in a low temperature experimental room the ambient air itself may be a suitable source. FIGURE 6 illustrates the general technique that may be employed in these somewhat unusual conditions. In this figure, the subject 90 places his breathing organs within a suitable receiver 91 into which the ambient air is continuously drawn at a constant rate and passed through a communicating conduit 92 having the sensor 16 and connecting with the constant volume pump 12 which preferably exhausts through a conduit 93 leading through a suitable barrier wall 94 such that the exhausted air and inlet air are not able to mix. Within the ambient air itself there is located the sensor 15 which like sensor 16 feeds into the recorder 17. By interpreting the recorded data as previously explained, the respiration volume rates, as well as the respiration rate, may be determined.

Dewpoint hygrometers, wet and dry bulb electrical thermometers and other electrical and mechanical relative and absolute humidity measuring, signalling, recording and computing systems may be adopted for purposes of measuring and recording the subject contribution of moisture to the dry gas. Means other than the constant volume pump and flowmeter described could be used for achieving constant rate of flow. Where "air" is used in the claims it is meant to include any of the several known forms of breathable gases such as oxygen, air and the like and where "dry air" is used it is meant to include any of such gases of sufficient dryness to make said invention operable. The word "body" in the claims refers to humans as well as animals. The several forms of apparatus described are exemplary. Many other types of apparatus may be used without departure from the spirit and scope of the invention as defined in the appended claims.

Having described the invention, I claim:

1. In apparatus for measuring the volume of air breathed by a body during a stated time, the combination of a dry air source in continuous and exclusive communication with the breathing organ of said body and adapted to envelop said organ continuously with said air; expiration receiving means located adjacent said organ but out of contact therewith and adapted to simultaneously and continuously receive dry air from said source and expired air from said organ; constant flow means in communication with said receiving means whereby said dry air is made to move continuously during said time past said organ and with said expired air through said receiving means at a constant rate of flow; and electrical means for continuously measuring the amount of moisture contributed to said dry air during said time by said body, as a measure of said volume.

2. The apparatus as claimed in claim 1 wherein said measuring means includes a pair of electrical humidity sensors located respectively in said dry air prior to its passing said organ and in said dry air after passing said organ; and recording means connected to said sensors.

3. The apparatus as claimed in claim 1 wherein said constant flow means comprises a constant volume pump.

4. The apparatus as claimed in claim 1 wherein said expiration collecting means comprises a pair of radially spaced coaxially arranged thin walled conical funnel shaped members residing one within the other the innermost of said members being in communication with said constant flow means and the outermost of said members being in communication with said source whereby dry air is enabled to flow between said members to said organ and expired air is enabled to flow from said organ into said innermost member.

5. In apparatus for measuring the volume of air breathed by a body during a stated time, the combination of a continuous dry air source; a hood surrounding but out of contact with the breathing organ of said body; an intake conduit placing the said hood in continuous and exclusive communication with said source whereby continuously to envelop said organ with said dry air; a discharge conduit communicating with said hood and including constant flow means whereby said dry air is continuously drawn at a constant rate from said source through said hood past said organ and through said discharge conduit; and electrical means for continuously measuring the amount of moisture contributed to said dry air by said organ during said time as a measure of said volume.

6. The apparatus as claimed in claim 5 wherein said measuring means includes a pair of electrical humidity sensors located respectively in the path of said dry air prior to its passing said organ and in the path of said dry air after passing said organ; and recording means connected to said sensors.

7. The apparatus as claimed in claim 5 wherein said hood is made substantially air tight.

8. The apparatus as claimed in claim 5 wherein said hood is constructed with an open bottom adapted to rest on mattresses and the like and wherein said dry air is placed under slight positive pressure to offset any air leakage through said bottom.

9. In a method of measuring the volume of air breathed by a body during a stated time, the steps of establishing a stream of dry air moving at a constant rate past the breathing organ of said body wherein said organ is continuously enveloped by and breathes exclusively from and into said dry air; withdrawing simultaneously and continuously the dry air not breathed; and the air expired by said organ through a common receptacle located near but out of contact with said organ and electrically measuring continuously the moisture content in said dry air prior to reaching said organ and in said receptacle to indicate the moisture contributed by said body to said dry air over said time as a measure of said volume.

10. The method of measuring respiration volume rate which comprises confining the head of the body in an enclosure during the measuring period; continuously moving throughout said period a stream of substantially dry air through said enclosure past the breathing organ of the body at a constant rate in excess of the body's respiration requirements while maintaining said organ continuously enveloped with said dry air and out of contact with said enclosure; maintaining said enclosure during said period in condition to resist entrance of outside air therein; continuously withdrawing during said period said dry air including air expired by said body at said constant rate; and electrically measuring continuously the moisture content in said dry air prior to reaching said organ and in said withdrawn air to indicate the moisture contributed by said body to said dry air as a measure of said volume rate.

11. The method of claim 10 wherein said step of maintaining said enclosure during said period in condition to resist entrance of outside air therein comprises maintaining said enclosure in air tight condition.

12. The method of measuring respiration volume rate which comprises confining the head of the body in an enclosure during the measuring period; continuously introducing into said enclosure substantially dry air at a constant rate of flow in excess of the respiration of said body; allowing said body to breathe from and into said dry air exclusively during said period while maintaining said organ continuously enveloped with said dry air and out of contact with said enclosure; continuously withdrawing said dry air from said enclosure at said rate of flow; and electrically measuring continuously the moisture therein as the same is withdrawn and as introduced in said enclosure as a measure of said volume rate.

13. In a method of measuring the volume of air breathed by a body during a stated time, the steps of establishing a stream of air moving past the breathing organ of said body wherein said organ is continuously enveloped by and breathes exclusively from and into said air; collecting a quantity of air not breathed with all the air expired by said organ into a common receptacle near but out of contact with said organ; and electrically measuring continuously the moisture content in said dry air prior to reaching said organ and in said air passing through said receptacle to indicate the moisture contributed by said body to said quantity over said time as a measure of said volume.

14. In a method of measuring the respiration rate of a body, the steps of locating in the path of expired air leaving said body of an electrical sensor whose response depends on moisture received from said expired air; directing each successive breath in a series of breaths of said expired air at said sensor whereby to produce electrical responses with each breath; and counting the number of responses per unit of time as a measure of said rate.

References Cited in the file of this patent

UNITED STATES PATENTS

| | | |
|---|---|---|
| 1,550,335 | Benedict | Aug. 18, 1925 |
| 2,098,280 | Dornseif | Nov. 9, 1937 |
| 2,527,716 | Fleisch | Oct. 31, 1950 |
| 2,875,750 | Boucke | Mar. 3, 1959 |
| 2,944,542 | Barnett | July 2, 1960 |
| 3,000,376 | Smith | Sept. 19, 1961 |

UNITED STATES PATENT OFFICE
CERTIFICATE OF CORRECTION

Patent No. 3,026,868                                        March 27, 1962

Daniel I. Weinberg

It is hereby certified that error appears in the above numbered patent requiring correction and that the said Letters Patent should read as corrected below.

In the grant, line 1, and in the heading to the printed specification, line 4, name of inventor, for "Daniel L. Weinberg", each occurrence, read -- Daniel I. Weinberg --; column 8, line 30, for "poseitive" read -- positive --; line 38, after "breathed" strike out the semicolon and insert the same after "organ" in line 40, same column 8.

Signed and sealed this 10th day of July 1962.

(SEAL)
Attest:

ERNEST W. SWIDER
Attesting Officer

DAVID L. LADD
Commissioner of Patents